United States Patent
Hemery et al.

[19]

[11] Patent Number: 6,069,699
[45] Date of Patent: *May 30, 2000

[54] TRIAXIAL LASER RATE GYRO SYMMETRIZED WITH RESPECT TO ITS AXIS OF ACTIVATION

[75] Inventors: Eric Hemery, Chatellerault; Etienne Bonnaudet, St Georges les Baillargeaux, both of France

[73] Assignee: Sextant Avionique, Velizy Villacoublay, France

[*] Notice: This patent is subject to a terminal disclaimer.

[21] Appl. No.: 09/147,103

[22] PCT Filed: Feb. 3, 1998

[86] PCT No.: PCT/FR98/00192

§ 371 Date: Oct. 5, 1998

§ 102(e) Date: Oct. 5, 1998

[87] PCT Pub. No.: WO98/35207

PCT Pub. Date: Aug. 13, 1998

[30] Foreign Application Priority Data

Feb. 5, 1997 [FR] France ................................. 97 01267

[51] Int. Cl.[7] .................................................. G01C 19/66

[52] U.S. Cl. .............................................. 356/350; 372/94

[58] Field of Search ................................ 356/350; 372/94

[56] References Cited

U.S. PATENT DOCUMENTS

| 4,837,774 | 6/1989 | Jabr et al. | 356/350 |
| 4,839,903 | 6/1989 | Simms et al. | 356/350 |
| 5,940,179 | 8/1999 | Jaulain et al. | 356/350 |

FOREIGN PATENT DOCUMENTS

| 2730561 | 8/1996 | France | 356/350 |
| 2137013 | 9/1984 | United Kingdom | 356/350 |

*Primary Examiner*—Samuel A. Turner
*Attorney, Agent, or Firm*—Oblon, Spivak, McClelland, Maier & Neustadt, P.C.

[57] ABSTRACT

The rate gyro according to the invention comprises, in one optical block, three optical cavities (B, C, D) of square shape which are devised in such a way that each of the corners of a cavity (B, C, D) coincides and communicates with the corner of another cavity, a control mirror ($M_4$ to $M_6$) or reading mirror ($M_1$ to $M_3$) being associated with each pair of coincident corners, the three cavities (B, C, D) communicating with a cathode chamber (CK) by way of three cathode capillaries ($CK_1$ to $CK_3$) with an equilibration chamber (CE) by way of three equilibration capillaries ($CE_1$ to $CE_3$). The control mirrors ($M_4$ to $M_6$), the reading mirrors ($M_1$ to $M_3$), the cathode capillaries ($CK_1$ to $CK_3$), the equilibration capillaries ($CE_1$ to $CE_3$) and the anodes are mutually symmetric according to a symmetry of revolution of order 3 about the activation axis $\Delta$ (that is to say may be deduced from one another by a 120° rotation about the axis $\Delta$).

7 Claims, 3 Drawing Sheets

TRIAXIAL LASER RATE GYRO SYMMETRIZED WITH RESPECT TO ITS AXIS OF ACTIVATION

FIELD OF THE INVENTION

The subject of the present invention is a triaxial laser rate gyro symmetrized with respect to its cathode axis and to its activation axis.

It relates more particularly to a laser rate gyro with monoblock optics comprising an optical block, made for example of quartz or Zerodur, comprising three intercommunicating resonant optical cavities (one per detection axis), for example of the type which is described in patent FR No. 80 06298, filed on Mar. 21, 1980 in the name of Société Francaise d'Equipments pour la Navigation Aérienne (S.F.E.N.A.), and transferred to Sextant Avionique. In this example, these three cavities together form a regular octahedron having eight triangular faces: the cavities each have a square shape and extend in three orthogonal planes (respectively perpendicular to the three sensitive axes). These cavities are devised in such a way that each of the corners of a cavity coincides and communicates with the corner of another cavity. A mirror associated with each pair of coincident corners is oriented in such a way as to be used by the two cavities forming the said pair. In each cavity one of these mirrors, termed the reading mirror, is associated with a mixing prism which makes it possible to create an interference phenomenon for detecting the motions of the rate gyro and hence of the vehicle which supports it. Another mirror, termed the control mirror, is mounted on a transducer support in such a way as to be able to control the length of the cavity with a view to obtaining maximum output power. Each of the cavities which enclose a gas under low pressure is fitted with at least one cathode and with two suitably placed anodes, so as to cause excitation of the electrons of the atoms of the gas and to produce two counter-propagating beams of laser radiation inside the cavity which propagate in opposite directions along the optical path. To compensate for the frequency offset between the two counter-propagating waves, two symmetric discharges are created in the cavity by virtue of a cathode, the housing of the cathode being in communication, by virtue of two capillaries, with the two opposite regions of the cavity in which it is desired to obtain the two discharges.

In fact, in a three-axis rate gyro of the aforesaid type, a single cathode is used which links the three cavities by way of three cathode capillaries.

Consequently, this cathode constitutes a concentrated source of heat on one side of the optical block and therefore creates, in this bloc, a thermal gradient which disturbs the flows of the gas streams. Compounded with this problem is the one due to the fact that there is a pressure difference between the two ends of the discharge and, in particular, between the anode and the gas reserve constituted by the cathode.

To solve these problems it has already been proposed, especially by patent application ER No. 95 01645, filed on Feb. 10, 1995 in the name of Sextant Avionique, to compensate for the asymmetry created in the optical block by the cathode chamber by virtue of an equilibration chamber communicating with the cavity of the rate gyro and made in the optical block on the opposite side from the cathode chamber. This equilibration chamber is advantageously arranged symmetrically in relation to the cathode chamber with respect to a plane, an axis or a centre of symmetry of the block.

SUMMARY OF THE INVENTION

The purpose of the invention is more particularly to improve the performance of this type of rate gyro.

It proposes, on the one hand, to distribute the various categories of elements: control mirrors, reading mirrors, active capillaries, passive capillaries, anodes, of a triaxial laser rate gyro constructed from an optical block provided with a cathode chamber and with an equilibration chamber, which are coaxial, in and around the optical block in such a way as to comply with, in respect of each category of elements, a symmetry of revolution of order 3 about the axis $\Delta$ which is common to the cathode chamber and to the equilibration chamber and is merged with a trisector of the cube enveloping the optical block and having the mirrors at the centres of these faces, the elements of one category being deduced from one another by a 120° rotation about the axis of revolution $\Delta$ and, on the other hand, to use the aforesaid axis of revolution A as activation axis.

It is observed that these arrangements have the effect moreover of easing mechanical assembly of the optical block since the center of gravity and the center of inertia lie on the activation axis, thus limiting the conical motions of the block.

BRIEF DESCRIPTION OF THE DRAWINGS

A mode of execution of the invention will be described below, by way of non-limiting example, with reference to the appended drawings in which.

Figure 3:
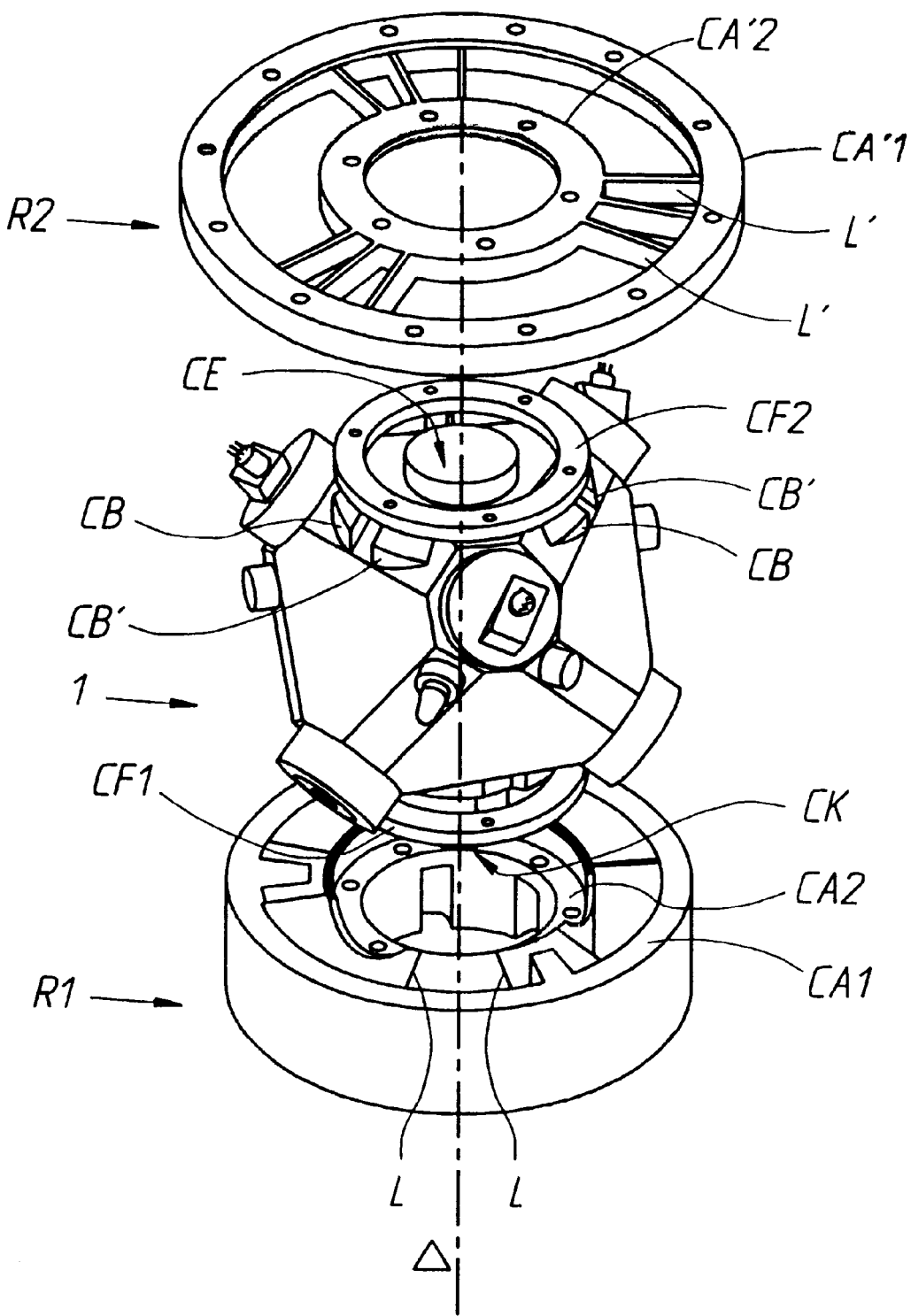
FIG. 3 shows, in perspective, the optical block of a rate gyro with the activation mechanism associated therewith.

In this example, the rate gyro comprises an optical block 1 of octahedral shape with chamfered edges (FIG. 3) and inside which are made, in three orthogonal planes, three cavities B, C, D comprising the capillary segments $B_1$ to $B_4$ $-C_1$ to $C_4$ $-D_1$ to $D_4$ and each delimiting an optical path of square shape.

These cavities B, C, D are devised in such a way that each of the corners of a cavity coincides and communicates with the corner of another cavity. They therefore define, in the interior space of the block, a regular octahedron having eight triangular faces parallel to those of the block and six vertices at which are placed six respective mirrors $M_1$, $M_2$, $M_3$, $M_4$, $M_5$, $M_6$ which extend respectively in the planes of the faces of a cube within which the octahedron is inscribed. In this example, the mirrors $M_1$, $M_2$, $M_3$ are reading mirrors, whereas the mirrors $M_4$, $M_5$, $M_6$ are control mirrors associated with piezoelectric transducers for adjusting the lengths of the cavities.

To create the pairs of counter-propagating beams inside the three cavities B, C, D, the rate gyro comprises a cathode K and six anodes A.

The cathode K equips a cathode chamber CK whose axis $\Delta$ is perpendicular to the cathode face $F_1$ of the octahedron delimited by the capillary segments $B_3$, $C_3$, $D_3$ and passes through the centre of this face $F_1$. This chamber CK which is outside the octahedral volume defined by the cavities B, C, D, communicates with them at the three control mirrors $M_4$, $M_5$, $M_6$ which define the face $F_1$, by way of three respective capillaries $CK_1$, $CK_2$, $CK_3$. These three cathode capillaries are arranged symmetrically according to a symmetry of revolution of order 3 about the axis $\Delta$ (that is to say may be deduced from one another by a 120° rotation about the axis $\Delta$), which is, as may be observed, a trisector of the cube enveloping the optical block 1 of octahedral shape and having the mirrors at the centres of its faces.

These three capillaries $CK_1$, $CK_2$, $CK_3$ (or cathode outlets) allow the ionization of the active capillaries between cathode K and anode A.

Figure 1:
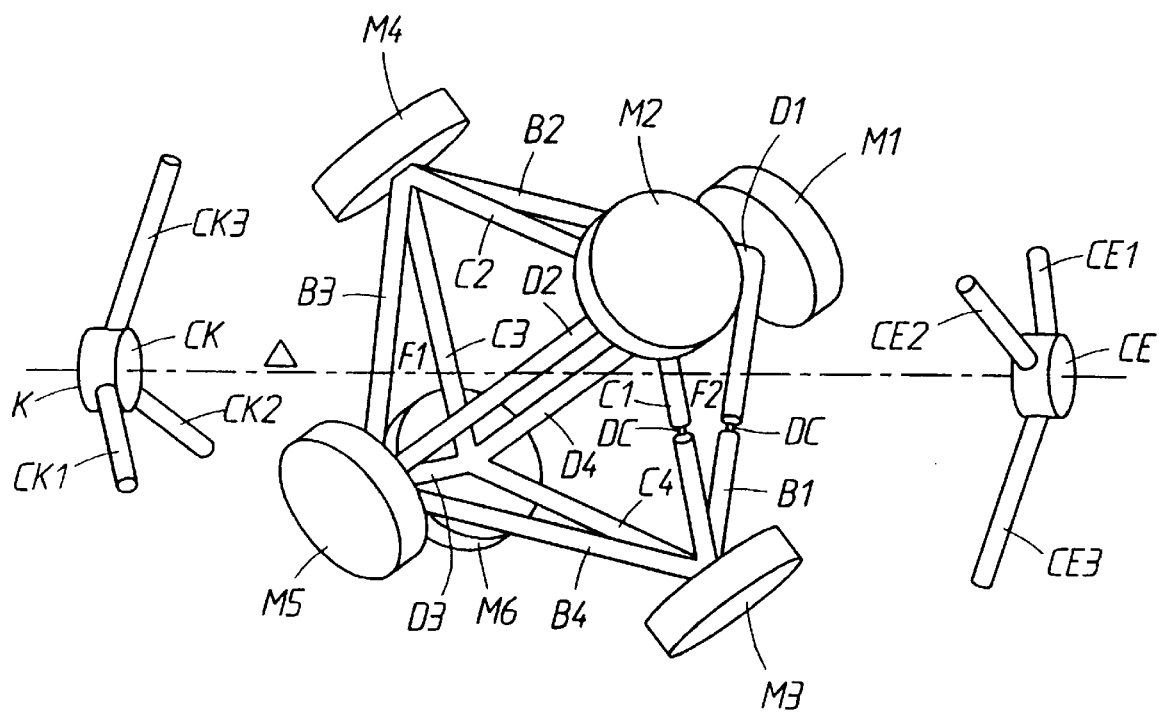
FIG. 1 is a perspective diagrammatic representation of the cavities of a triaxial monoblock laser rate gyro with six mirrors according to the invention.
Figure 2:
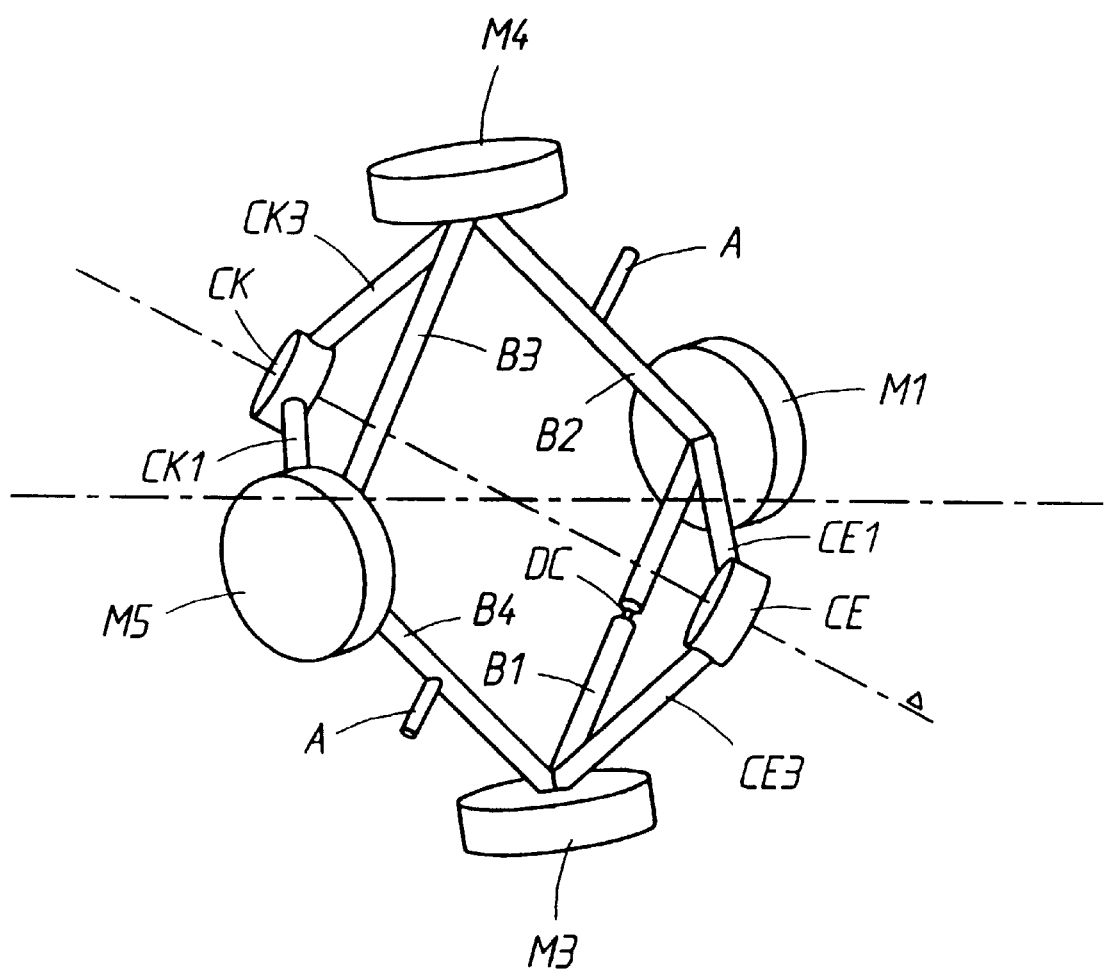
FIG. 2 shows a cavity of the rate gyro represented in FIG. 1 with its connections to the cathode and to the compensation chamber as well as its two anodes.

The six anodes A, only two of which have been represented in FIG. 2, are arranged in such a way as to obtain in each cavity a pair of discharge zones ("active zones") which are symmetric with respect to an axis of symmetry distinct from the axis of symmetry A. Each anode pair A extends in the plane of the corresponding cavity B, C, D. For the set of three cavities B, C, D there are three pairs of anodes which are also distributed within the optical block in such a way as to comply with the symmetry of revolution of order 3 about the axis $\Delta$ and as to be deduced from one another by a 120° rotation about this axis of revolution $\Delta$.

The thermal and thermodynamic equilibration is obtained here by means of an equilibration chamber CE of cylindrical shape, substantially identical to that of the cathode chamber CK and arranged coaxially, in relation to the latter, outside the octahedral volume looking onto the face $F_2$ opposite the face $F_1$ (these two faces being perpendicular to the axis $\Delta$). This face $F_2$ is delimited by three capillary segments $B_1$, $C_1$, $D_1$ which each have a diaphragm DC in their central region. These three diaphragms DC are arranged symmetrically, according to a symmetry of revolution of order 3 with respect to the axis $\Delta$ and may be deduced from one another by a 120° rotation about this axis of revolution $\Delta$.

The equilibration chamber CE communicates with the three cavities B, C, D at the level of the three reading mirrors $M_1 M_2$, $M_3$ which define the face $F_2$, by virtue of three equilibration capillaries $CE_1$, $CE_2$, $CE_3$ arranged symmetrically, according to a symmetry of revolution of order 3 with respect to the axis $\Delta$ and deduced from one another by a 120° rotation about this axis of revolution $\Delta$.

To comply with the symmetry of the flows, the three capillaries $CE_1$, $CE_2$, $CE_3$ may be arranged in one and the same plane perpendicular to the axis $\Delta$. The same holds for the three capillaries $CK_1$, $CK_2$, $CK_3$.

By virtue of these arrangements, the equilibration chamber CE equilibrates the pressures, on the anode A side of each of the six active zones. The whole comprising the cathode chamber CK and the three capillaries $CK_1$, $CK_2$, $CK_3$ which are associated with it ensures, for its part, equalization of the pressures of the six active zones, on the cathode K side.

Consequently, the six active zones are subjected to the same pressure difference and give rise to the same flows, even in the case in which these flows are disturbed by thermal gradients, these being minimized for the reasons described earlier.

Of course, the equilibration chamber could comprise means making it possible to obtain a Getter effect, or even exert a thermal compensation heating of the block.

These arrangements therefore make it possible to reduce the intrinsic sensitivities of the rate gyro (false zero) to temperature variations, to the Fizeau effect, and to the operating current.

Moreover, in accordance with the invention, the optical block of the rate gyro is mounted on an activation mechanism in such a way that the axis of symmetry of revolution $\Delta$ is merged with the activation axis of the rate gyro. This is possible since the three cavities of the optical block rotate at the same rate about this axis of revolution $\Delta$.

In this example, the activation mechanism comprises firstly an activation wheel $R_1$ comprising two coaxial rings $CA_1$, $CA_2$ linked together by a plurality of radial spokes L. These spokes L comprise a piezoelectric detection and motor element linked to an amplifier so as to cause an alternating rotational motion of one of the rings $CA_2$ with respect to the other $CA_1$.

The fastening of the optical block 1 to the central ring $CA_2$ (activation ring) of the activation mechanism is performed by means of a fastening ring $CF_1$, of substantially the same diameter as the activation ring $CA_2$ to which it can be assembled coaxially by screwing.

This fastening ring $CF_1$ which is intended to be arranged coaxially with the cathode K, comprises three pairs of bevelled wedges (not visible) situated at 120° to one another, and intended to be cemented respectively to the central regions of the chamfered edges surrounding the face $F_1$ of the block.

The activation mechanism comprises, moreover, an equilibration wheel $R_2$ comprising two coaxial rings $CA'_1$, $CA'_2$ linked together by a plurality of flexible radial spokes L'.

In a manner analogous to that above, the fastening of the ring $CA'_2$ to the optical block 1 (at the opposite end of its equatorial plane relative to the activation wheel $R_1$) is performed by means of a fastening ring $CF_2$ of substantially the same diameter as the ring $CF_1$ and identical to the ring $CA'_2$ to which it may be assembled coaxially with the aid of screws.

This fastening ring $CR_2$ which is intended to be arranged coaxially with the equilibration chamber CE comprises three pairs of bevelled wedges CB, CB' situated at 120° to one another and intended to be cemented respectively to the central regions of the chamfered edges surrounding the face $F_2$.

This mode of fastening has the advantage of considerably reducing the wrenching stresses between the wedges CB and CB' and the optical block when the latter is made to rotate.

Advantageously, the rings $CA_1$ and $CA'_1$ of the two wheels $R_1$, $R_2$ may be secured to one another.

By virtue of these arrangements, excellent equilibration of the optical block 1 is obtained together with a corresponding reduction in the conical motion (the latter is already considerably reduced by virtue of the fact that the center of gravity and the center of inertia are on the activation axis).

Moreover, by reason of the compliance with the symmetry of revolution of order 3 about the axis $\Delta$ by the mechanical components and of the symmetric arrangement of the pairs of fastening wedges CB, CB' by which the thermal dissipations are effected, the thermal symmetrization of the block is preserved, or even improved.

Now, it is noted that the association of this symmetrization with respect to the activation axis $\Delta$ taken as axis of revolution with the equalization of the internal pressures of the anodes A by virtue of the presence of the equilibration chamber makes it possible to nullify the potential effect of energization on the false zero and reduces the outside thermal effects.

Advantageously, the axis $\Delta$ of the optical block will be vertical. This is because, in this case, the gas flows as well as the thermal gradients remain perfectly symmetric and hence the effects induced on the false zero are nullified.

What is claimed is:

1. A triaxial rate gyro, comprising:

an optical block including:

three communicating resonant optical cavities which form a regular octahedron having eight triangular faces, each of the cavities having four capillary segments forming a square which is perpendicular to a respective sensitive axis and having a corner which coincides and communicates with a corner of another cavity so as to form six coincident corners, three reading mirrors associated with three corners of the six coincident corners;

three cavity length control mirrors associated with another three corners of the six coincident corners;

a cathode chamber including three cathode capillaries respectively emerging at the three reading mirrors, and an equilibration chamber having three equilibration capillaries respectively emerging at the three cavity length control mirrors;

an activation mechanism configured to drive the optical block according to an alternating motion of rotation about an activation axis; and fastening wedges disposed on central regions of chamfered edges surrounding one of the triangular faces of the octahedron, wherein the three control mirrors, the three reading mirrors, the three cathode capillaries, the three equilibration capillaries, and the fastening wedges are arranged in and around the optical block so as to have a symmetry of revolution of order 3 about a common axis of revolution merged with the activation axis.

2. The gyro according to claim 1, wherein the cathode chamber and the equilibration chamber are coaxial with the axis of rotation, the axis of rotation being perpendicular and passing through a center of two opposite faces of the eight triangular faces which are respectively delimited by the three cavity control mirrors and the three reading mirrors.

3. The gyro according to claim 1, wherein each cavity comprises a pair of anodes extending in a plane of the cavity so as to delimit the cavity into a pair of active discharge zones, said discharge zones being symmetric with respect to an axis of symmetry different than the axis of revolution.

4. The gyro according to claim 2, further comprising:

three diaphragms in a central region of three capillary segments of the four capillary segments which delimit one of the two opposite faces, wherein the three diaphragms are arranged symmetrically according to the symmetry of revolution of order 3 with respect to the axis of revolution.

5. The gyro according to claim 1, wherein the activation mechanism comprises at least one wheel having two coaxial rings linked together by a plurality of radial spokes, the radial spokes including a motor element configured to cause an alternating rotational motion of one of the two coaxial rings to the other coaxial ring, and wherein the fastening wedges are configured to fasten the optical block to one of the two coaxial rings.

6. The gyro according to claim 1, wherein the fastening wedges are arranged pairwise and are cemented to the central regions of the chamfered edges surrounding one of the triangular faces of the octahedron.

7. The gyro according to claim 1, wherein the axis of revolution of the optical block is vertical.

\* \* \* \* \*